(12) United States Patent
Risberg et al.

(10) Patent No.: US 11,507,098 B2
(45) Date of Patent: Nov. 22, 2022

(54) SYSTEM AND METHOD FOR IDENTIFYING VEHICLES THAT CAN HANDLE SPECIFIC ROAD SEGMENTS

(71) Applicant: Toyota Motor North America, Inc., Plano, TX (US)

(72) Inventors: Chris Risberg, Flower Mound, TX (US); Katsumi Nagata, Foster City, CA (US); Ryan Wiesenberg, Ann Arbor, MI (US); Sachin Ahire, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 361 days.

(21) Appl. No.: 16/517,059

(22) Filed: Jul. 19, 2019

(65) Prior Publication Data

US 2021/0018923 A1    Jan. 21, 2021

(51) Int. Cl.
  G05D 1/02       (2020.01)
  G05D 1/00       (2006.01)
  G01C 21/34      (2006.01)
  B60Q 9/00       (2006.01)

(52) U.S. Cl.
  CPC ....... G05D 1/0214 (2013.01); G01C 21/3461 (2013.01); G05D 1/0088 (2013.01); B60Q 9/00 (2013.01); G05D 2201/0213 (2013.01)

(58) Field of Classification Search
  CPC .............. G05D 1/0214; G05D 1/0088; G05D 2201/0213; G01C 21/3461; G01C 21/3697; G01C 21/367; B60Q 9/00; B60K 23/08

See application file for complete search history.

(56) References Cited

U.S. PATENT DOCUMENTS

| 7,236,892 | B2 | 6/2007 | Ogawa |
| 7,873,471 | B2 | 1/2011 | Giseke |
| 8,504,293 | B2 | 8/2013 | Ishikawa et al. |
| 8,825,380 | B2 | 9/2014 | Machino |
| 9,020,760 | B2 | 4/2015 | Fryer et al. |
| 9,547,309 | B2 | 1/2017 | Ross et al. |
| 9,587,954 | B2 | 3/2017 | Gusikhin et al. |

(Continued)

FOREIGN PATENT DOCUMENTS

| CN | 110779537 A | * | 2/2020 | ......... G01C 21/3694 |
| DE | 102016002466 | | 9/2016 | |

(Continued)

*Primary Examiner* — Donald J Wallace
(74) *Attorney, Agent, or Firm* — Snell & Wilmer LLP

(57) ABSTRACT

Methods and systems for identifying whether a vehicle is capable of safely traversing a road segment. The system includes a transceiver of the vehicle configured to receive vehicle capability data indicating vehicle specifications associated with the road segment, the vehicle specifications associated with a vehicle capable of traversing the road segment. The system includes an electronic control unit (ECU) of the vehicle configured to compare vehicle data including features of the vehicle with the vehicle capability data to determine whether the vehicle data meets or exceeds the vehicle specifications. The system includes an input/output device configured to provide a notification that the vehicle is not capable of traversing the road segment when the vehicle data does not meet or exceed the vehicle specifications associated with the road segment.

20 Claims, 5 Drawing Sheets

(56) References Cited

U.S. PATENT DOCUMENTS

| | | | |
|---|---|---|---|
| 10,099,697 B2 | 10/2018 | Tatourian et al. | |
| 10,134,278 B1 * | 11/2018 | Konrardy | G08G 1/096791 |
| 10,232,708 B2 | 3/2019 | Burt et al. | |
| 2011/0184642 A1 | 7/2011 | Rotz et al. | |
| 2013/0181825 A1 | 7/2013 | Johnson et al. | |
| 2017/0129491 A1 * | 5/2017 | Tatourian | G08G 1/096775 |
| 2018/0068495 A1 | 3/2018 | Chainer et al. | |
| 2018/0231389 A1 | 8/2018 | De Nunzio et al. | |
| 2020/0192403 A1 * | 6/2020 | Silver | G01S 13/867 |

FOREIGN PATENT DOCUMENTS

| | | | |
|---|---|---|---|
| NL | 2001133 | 12/2007 | |
| WO | WO-2018007330 A1 * | 1/2018 | G08G 1/22 |

\* cited by examiner

SYSTEM AND METHOD FOR IDENTIFYING VEHICLES THAT CAN HANDLE SPECIFIC ROAD SEGMENTS

BACKGROUND

1. Field

This specification relates to a system and a method for identifying whether a vehicle is capable of handling a specific road segment.

2. Description of the Related Art

Certain vehicles are better suited for certain terrain and conditions than others. For example, a sport utility vehicle is better suited for off-road terrain and/or snowy terrain than a compact sedan. In some situations, the driver may not be aware that a road has certain terrain and conditions that the driver's vehicle is unable to handle. In these situations, the vehicle may be damaged and/or occupants of the vehicle may be injured as a result of the vehicle's inability to handle the conditions of the road. Thus, there is a need for improved vehicle road systems.

SUMMARY

What is described is a system for identifying whether a vehicle is capable of safely traversing a road segment. The system includes a transceiver of the vehicle configured to receive vehicle capability data indicating vehicle specifications associated with the road segment, the vehicle specifications associated with a vehicle capable of traversing the road segment. The system includes an electronic control unit (ECU) of the vehicle configured to compare vehicle data including features of the vehicle with the vehicle capability data to determine whether the vehicle data meets or exceeds the vehicle specifications. The system includes an input/output device configured to provide a notification that the vehicle is not capable of traversing the road segment when the vehicle data does not meet or exceed the vehicle specifications associated with the road segment.

Also described is a vehicle. The vehicle includes a transceiver configured to receive vehicle capability data indicating vehicle specifications associated with an upcoming road segment, the vehicle specifications associated with a vehicle capable of traversing the upcoming road segment. The vehicle also includes an electronic control unit (ECU) configured to compare vehicle data including the vehicle features with the vehicle capability data to determine whether the vehicle data meets or exceeds the vehicle specifications. The vehicle includes an input/output device configured to provide a notification that the vehicle is not capable of traversing the upcoming road segment when the vehicle data does not meet or exceed the vehicle specifications associated with the upcoming road segment.

Also described is a method for identifying whether a vehicle is capable of safely traversing a road segment. The method includes receiving, by a transceiver of the vehicle, vehicle capability data indicating vehicle specifications associated with the road segment, the vehicle specifications associated with a vehicle capable of traversing the road segment. The method includes comparing, by an electronic control unit (ECU) of the vehicle, vehicle data including features of the vehicle with the vehicle capability data to determine whether the vehicle data meets or exceeds the vehicle specifications associated with the road segment. The method includes providing, by an input/output device, a notification that the vehicle is not capable of traversing the road segment when the vehicle data does not meet or exceed the vehicle specifications associated with the road segment.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for identifying whether a vehicle is capable of safely traversing a road segment. In some situations, a vehicle approaching a road segment may not be capable of traversing the road segment because of conditions of the road segment and the capabilities of the vehicle. For example, a compact sedan may not be capable of traversing a dirt road with rocks embedded in the dirt road. In these situations, the driver of the vehicle may desire to know beforehand whether the vehicle is capable of traversing the upcoming road segment—if the vehicle is not capable of traversing the upcoming road segment, the vehicle can find an alternate route, and if the vehicle is capable of traversing the upcoming road segment, the vehicle can proceed confidently.

The determination of whether a vehicle is capable of traversing a road segment may be made based on the vehicle telemetry data of many other vehicles which had previously traversed the road segment. The systems and methods described herein compare the vehicle data of vehicles which were able to traverse the road segment with the current vehicle's capabilities to determine whether the current vehicle is capable of traversing the road segment.

The systems and methods described herein increase the safety of the occupants of vehicles, as vehicles which are not capable of traversing certain road segments will not be driven on those road segments. Warnings may be provided to the driver and/or the driver may be automatically routed around these road segments that the vehicle is not capable of traversing.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle. As used herein, "handle" may be used to describe a vehicle's ability to safely traverse a road segment. As used herein, "road segment" may be used to refer to portions of a road or paths of various lengths, without regard to whether the path or road is paved or otherwise altered to accommodate vehicular travel.

Figure 1:
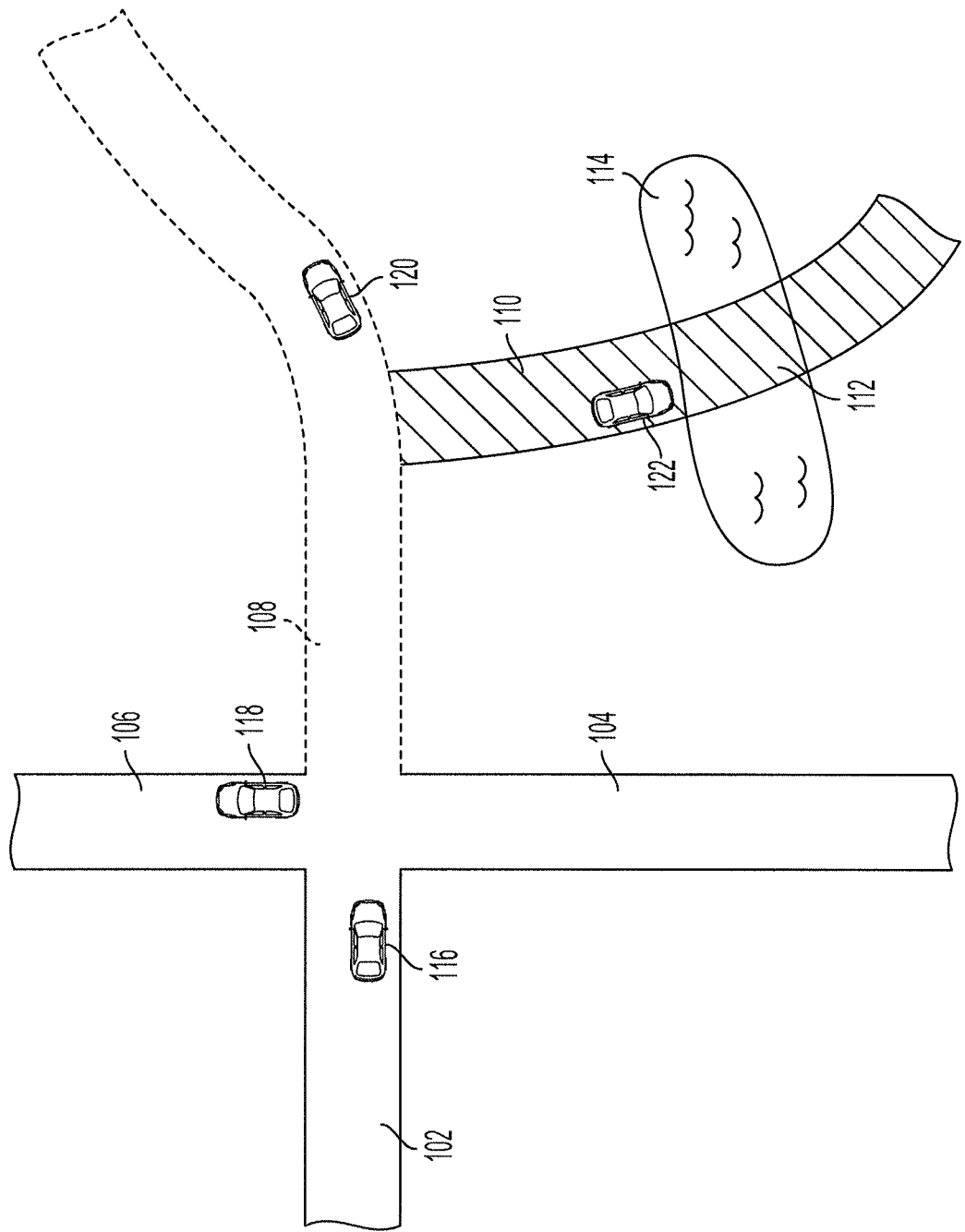
FIG. 1 illustrates vehicles travelling over various road segments, according to various embodiments of the invention.

FIG. 1 illustrates various road segments and vehicles travelling thereon. A road segment may begin or end at a dividing location, such as an intersection or a change in terrain. There is a first road segment 102, a second road segment 104, a third road segment 106, a fourth road segment 108, a fifth segment 110, a sixth road segment 112, and a seventh road segment 114.

The first road segment 102, the second road segment 104, and the third road segment 106 are paved roads. Paved roads may be covered in asphalt or other paving compound to allow any vehicle to safely and comfortably travel over the road. As such, the first vehicle 116 and the second vehicle 118 may be any type of vehicle. The first road segment 102, the second road segment 104, and the third road segment 106 may be clearly shown in maps and navigation units of a vehicle.

The fourth road segment 108 is an unpaved road. The unpaved road may be a dirt road, a grass road, or any other road that has not been covered in asphalt or other paving compound. The fourth road segment 108 may be traversed by many vehicles, but may not be suitable for vehicles which may be damaged by the uneven, rocky, or dusty conditions on the unpaved road. The fourth road segment 108 may be shown in maps and navigation units of a vehicle, but may be identified in a different color or line thickness than the first road segment 102, the second road segment 104, and the third road segment 106, which are paved roads.

The fifth road segment 110 is an off-road path. The off-road path may not have any formal identification as a road. The off-road path may be safely traversed by vehicles which possess the proper equipment and features. The fifth road segment 110 may meet a body of water 114 that may be a permanent or temporary collection of water. In some situations, the body of water 114 may be of a sufficiently shallow depth that a vehicle may traverse through the body of water 114 on the sixth road segment 112. The vehicles which are able to drive on the sixth road segment 112 may have features that enable these vehicles to survive the water, such as raised suspensions and off-road tires.

Vehicles may include an array of sensors to detect vehicle conditions, such as an inertial measurement unit configured to detect acceleration, deceleration, roll, pitch, and yaw of a vehicle; a suspension sensor configured to detect a compression of the suspension of the vehicle; a location sensor configured to detect a location of the vehicle; a brake sensor configured to detect brake engagement; an accelerator sensor configured to detect accelerator/throttle engagement; and a traction sensor configured to detect when the tires of the vehicles are losing traction.

Vehicles that drive on various road segments may communicate an indication to a remote data server whether the vehicle was able to safely traverse the road segment, the vehicles may communicate vehicle data indicating a type of vehicle and any features or equipment of the vehicle, and the vehicles may also communicate vehicle telemetry data detected by the vehicle sensors. For example, the third vehicle 120 may communicate to the remote data server an indication that it was able to traverse the fourth road segment 108, vehicle data (e.g., the third vehicle 120 is a sport utility vehicle from Vehicle Manufacturer A, Model B, Trim L with front wheel drive, standard suspension, and tires from Tire Manufacturer T), and vehicle telemetry data (e.g., IMU data, suspension data, brake data, and traction data).

When the remote data server receives a threshold number of road segment data from various vehicles, the remote data server may be able to determine what type of vehicles are able to traverse the road segment. For example, if all four-wheel-drive vehicles with ground clearance of at least 10 inches are able to traverse the sixth road segment 112, but no sedans were able to traverse the sixth road segment 112, the remote data server may determine that four-wheel-drive capability and at least 10 inches of ground clearance are recommended to traverse the sixth road segment 112. The driver of the fourth vehicle 122 may receive a notification as the fourth vehicle 122 approaches the sixth road segment 112 that it may not be able to traverse the upcoming road segment if the fourth vehicle 122 does not have four-wheel-drive and if the fourth vehicle 122 does not have at least 10 inches of ground clearance. In some embodiments, if the fourth vehicle 122 has four-wheel-drive and at least 10 inches of ground clearance, the driver of the fourth vehicle 122 may not receive a notification.

In addition to the vehicle telemetry detected as the vehicle traverses a road segment being used as an indicator of capability of the vehicle, driving patterns may also be analyzed. For example, if all compact sedans reach the end of the first road segment 102 and turn around instead of driving onto the fourth road segment 108, it may be inferred that the compact sedans did not proceed to driving on the fourth road segment 108 because it was not capable of doing so. When a threshold number of vehicles avoid a road segment, the system may determine that these vehicles are not capable of traversing the road segment. The system may analyze the vehicles that avoid the road segment to determine characteristics that are in common.

Further, roadside assistance calls made from a vehicle or driver of a vehicle at a road segment may be used as an indicator of capability of the vehicle. For example, if a relatively large number of front wheel drive sedans made roadside assistance calls at a particular road segment, the system may determine that the road segment is not capable of being traversed by a front wheel drive sedan.

The remote data server may also utilize weather information to change or update road segment classification permanently or temporarily. For example, the fifth road segment 110 may be classified as an icy road or closed due to snow. The vehicle requirements associated with the fifth road segment 110 may also be changes to require at least 14 inches of ground clearance in the winter due to changes in road conditions. Accordingly, in the winter, the fourth vehicle 122 may be warned against traversing over the fifth road segment 110 if it does not have sufficient ground clearance.

Using the data collected from the vehicles, the system may associate each road segment on a map with types of vehicles that are suited for traversing the road segment, and when a particular vehicle approaches a road segment, the system may determine whether the particular vehicle is capable of traversing the road segment. In addition to road segments, any location on a map may be associated with types of vehicles that can access the location.

Figure 2:
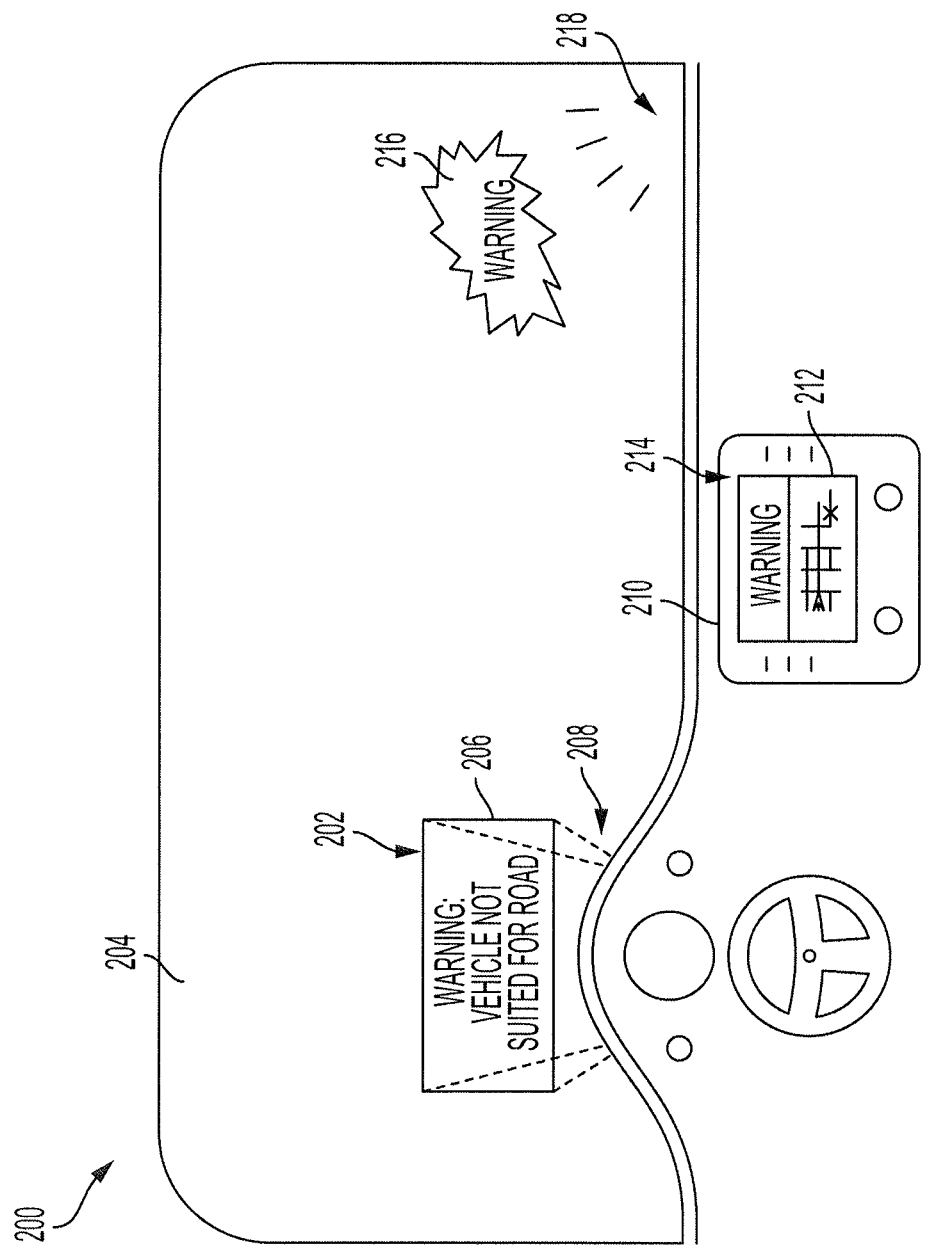
FIG. 2 illustrates presentation of road suitability information to a driver, according to various embodiments of the invention.

FIG. 2 illustrates example user interfaces presenting warning notifications to the driver of the vehicle 200. The vehicle 200 may include a heads-up display (HUD) image 206 that is projected from a HUD unit 208 onto a front windshield 204 of the vehicle 200. The HUD image 206 may include warning information 202 indicating that the vehicle 200 may not be suited for traversing the upcoming road segment. The warning information 202 may further include aspects of the vehicle 200 that render the vehicle 200 unfit for traversing the upcoming road segment. For example, the warning information 202 may state "Your vehicle does not have the required ground clearance." The warning information 202 may also include statistics of vehicles that have traversed the upcoming road segment. For example, the warning information 202 may state "Of the past 100 vehicles similar to yours that approached this road segment, 97 of them turned around and found an alternate route—you may do the same."

The vehicle 200 may also have an infotainment unit 210, which has an input/output device 212 (e.g., a touchscreen display). The input/output device 212 may also display warning information 214 similar to warning information 202. The infotainment unit 210 may also display a map with turn-by-turn navigation directions to a destination. The navigation directions may automatically avoid road segments which the vehicle 200 is unable to traverse. The map displayed by the input/output device 212 of the infotainment unit 210 may also show areas and road segments that the vehicle 200 are not capable of traversing.

The vehicle 200 may also have one or more speakers 218 configured to produce sounds. The speakers 218 may audibly present warning information 216 similar to warning information 202 for the driver to hear.

In addition to providing warning notifications that the vehicle is not capable of traversing the upcoming road segment, the system may also provide affirmative notifications when the vehicle is capable of traversing the upcoming road segment so that the driver may traverse the upcoming road segment confidently.

Figure 3:
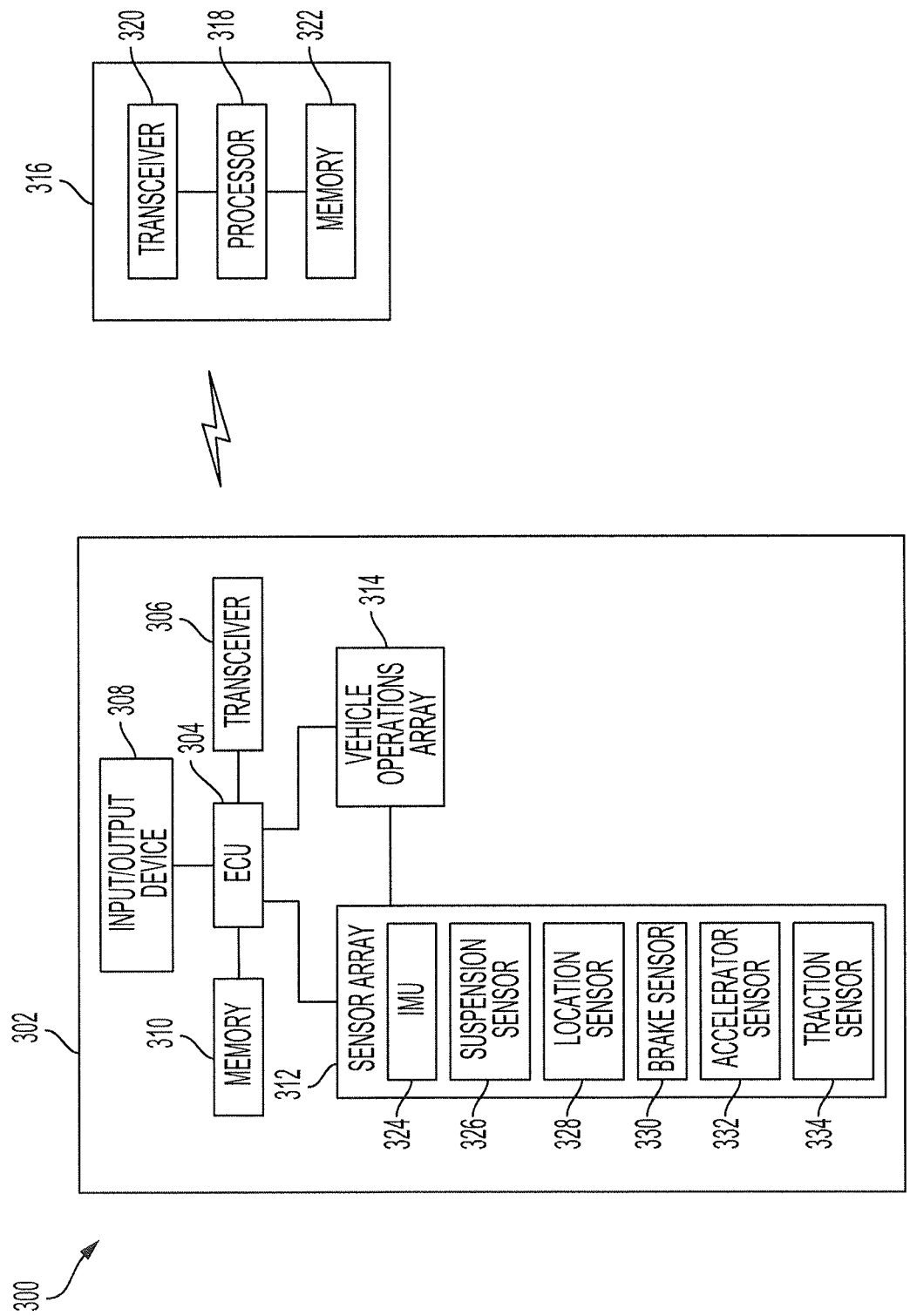
FIG. 3 illustrates a block diagram of the system, according to various embodiments of the invention.

FIG. 3 illustrates a block diagram of the system 300. The system 300 includes a vehicle 302 and a remote data server 316.

The vehicle 302 may have an automatic or manual transmission. The vehicle 302 is a conveyance capable of transporting a person, an object, or a permanently or temporarily affixed apparatus. The vehicle 302 may be a self-propelled wheeled conveyance, such as a car, a sports utility vehicle, a truck, a bus, a van or other motor or battery driven vehicle. For example, the vehicle 302 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 302 may be a semi-autonomous vehicle or an autonomous vehicle. That is, the vehicle 302 may be self-maneuvering and navigate without human input. An autonomous vehicle may use one or more sensors and/or a navigation unit to drive autonomously.

The vehicle 302 includes an electronic control unit (ECU) 304, an input/output device 308, a transceiver 306, a memory 310, a sensor array 312, and a vehicle operations array 314.

Each ECU 304 may be one or more ECUs, appropriately programmed, to control one or more operations of the vehicle. The one or more ECUs 304 may be implemented as a single ECU or in multiple ECUs. The ECU 304 may be electrically coupled to some or all of the components of the vehicle. In some embodiments, the ECU 304 is a central ECU configured to control one or more operations of the entire vehicle. In some embodiments, the ECU 304 is multiple ECUs located within the vehicle and each configured to control one or more local operations of the vehicle. In some embodiments, the ECU 304 is one or more computer processors or controllers configured to execute instructions stored in a non-transitory memory 310. The ECU 304 may utilize artificial intelligence logic and techniques to precisely determine that the vehicle is capable of safely traversing the road segment based on current and past data. The ECU 304 may also use the current condition of the vehicle to identify the vehicle capability assessment to ensure the vehicle is capable of safely traversing the road segment.

The vehicle 302 and one or more other vehicles similar to vehicle 302 may be coupled to a network. The network, such as a local area network (LAN), a wide area network (WAN), a cellular network, a digital short-range communication (DSRC), the Internet, or a combination thereof, connects the vehicle 302 to a remote data server 316.

The transceiver 306 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 306 may transmit data to and receive data from devices and systems not directly connected to the vehicle. For example, the ECU 304 may communicate with the remote data server 316. Furthermore, the transceiver 306 may access the network, to which the remote data server 316 is also connected. The vehicle 302 may communicate with other vehicles directly or via a network.

The sensor array 312 includes a plurality of vehicle sensors each configured to detect vehicle telemetry data. The sensor array 312 may include an inertial measurement unit (IMU) 324 configured to detect acceleration, deceleration, roll, pitch, and yaw of a vehicle. When the vehicle 302 is leaning in a certain direction to a dangerous degree (determined by comparison with a threshold value stored in memory 310), the IMU 324 may detect the IMU data that shows this leaning and the IMU data may be communicated to the remote data server 316. In addition, the IMU data may indicate whether a vehicle decelerated or accelerated when approaching a road segment. Abrupt deceleration may indicate an inability for the vehicle to traverse the road segment. For example, if many sedans decelerated before reaching a particular road segment, but no SUVs decelerated before reaching a particular road segment, then the system may determine that sedans are less able to traverse the particular road segment.

The sensor array 312 may include a suspension sensor 326 configured to detect suspension data. The suspension data may indicate a compression of the suspension of the vehicle and/or a ground clearance of the vehicle 302. When the ground clearance of the vehicle 302 does not meet a threshold ground clearance associated with a particular road segment, a notification may be provided to the driver, as illustrated in FIG. 2. The suspension data may also be used to determine a type of vehicle suitable for a road segment. For example, a vehicle with relatively high suspension may detect suspension data indicating that the suspension was compressed and decompressed to a high degree (determined by comparison with a threshold value stored in memory), and vehicles which do not have at least as high a suspension may not be able to safely traverse the road segment. The suspension data may be communicated to the remote data server 316, and the remote data server 316 may determine vehicle qualifications for the road segment based on suspension data from many vehicles.

The sensor array 312 may include a location sensor 328 configured to detect location data associated with the vehicle 302. The location sensor may be a GPS unit or any other global location detection device. The ECU 304 may use the location data along with the map data stored in the memory 310 to determine a location of the vehicle. In other embodiments, the location sensor 328 has access to the map data and may determine the location of the vehicle and provide the location of the vehicle to the ECU 304.

The location data may be used to determine whether the vehicle 302 approached a road segment and turned around and found an alternate route. The location data may include an indication of whether the road segment that was avoided was part of a set of navigation directions for the driver of the vehicle. When a threshold number or percentage of vehicles avoid a road segment, the system may determine that these vehicles are unable to traverse the road segment.

The sensor array 312 may include a brake sensor configured to detect brake data. The brake data may indicate braking engagement by the driver. When the brake data indicates aggressive and uneven braking, the system may determine that the road segment being traversed by the vehicle is challenging for the vehicle.

The sensor array 312 may include an accelerator sensor configured to detect accelerator/throttle engagement. When the accelerator/throttle engagement is constant and matches that of conventional driving habits, the system may determine that the vehicle travelling over a road segment is able to traverse the road segment.

The sensor array 312 may include a traction sensor configured to detect traction data. The traction data may indicate when the tires of the vehicles are losing traction. When the vehicle 302 loses traction frequently on a road segment, the system may determine that the road segment being traversed by the vehicle is challenging for the vehicle.

The memory 310 is connected to the ECU 304 and may be connected to any other component of the vehicle. The memory 310 is configured to store any data described herein, such as the map data, the location data, the suspension data, the IMU data, the braking data, the acceleration data, the traction data, the vehicle data, and any data received from the remote data server 316 via the transceiver 306. The vehicle data associated with the vehicle 302 may indicate the features and capabilities of the vehicle 302, and may include any modifications or equipment associated with the vehicle 302. For example, if the vehicle suspension is altered or all-weather tires are installed on the vehicle 302, the vehicle data may be accordingly updated. The vehicle data may be updated via the input/output device 308 or may be automatically detected by sensors in the sensor array 312.

The input/output device 308 may be a touchscreen display or a display screen and an input device, such as a keyboard, a microphone, or buttons. The input/output device 308 may be a touchscreen of an infotainment unit of the vehicle 302, a heads-up display, or a combination of a display screen of the infotainment unit and one or more buttons or knobs used to interact with the infotainment unit. The ECU 304 may be configured to render a graphical user interface to facilitate displaying of notifications and warnings as described herein.

The vehicle operations array 314 is connected to the ECU 304 and the sensor array 312. The vehicle operations array 314 may include a suspension system, a traction control system, or a drivetrain system, for example. The ECU 304 may communicate an indication to the vehicle operations array 314 to adjust one or more features of the vehicle 302 in anticipation of an upcoming road segment. For example, the ECU 304 may automatically instruct the drivetrain system to switch from two-wheel drive to all or four-wheel drive when a road segment is approaching that is associated with vehicles with all or four wheel drive capabilities.

The remote data server 316 includes a processor 318, a memory 322, and a transceiver 320. The processor 318 of the remote data server 316 may be one or more computer processors configured to execute instructions stored in non-transitory memory 322. The memory 322 may also store the vehicle telemetry data and the vehicle data received from the vehicle 302 and many other vehicles similar to vehicle 302.

In some embodiments, the processor 318 of the remote data server 316 may determine whether a vehicle is capable of traversing an upcoming road segment, and communicate, to the vehicle, an indication that the vehicle is unable to traverse the upcoming road segment.

In some embodiments, the processor 318 determines vehicle capability data indicating a vehicle type or features associated with each road segment or location, and the vehicle capability data is communicated to the vehicle 302. The vehicle 302 stores the vehicle capability data in the memory 310 and when the vehicle 302 approaches a road segment that the vehicle capability data indicates that the vehicle 302 is unable to handle, the vehicle 302 may produce a notification, as shown in FIG. 2.

The processor 318 of the remote data server 316 may collect all of the vehicle data and vehicle telemetry data from many vehicles (e.g., hundreds, thousands, or millions of vehicles) and determine vehicle capability data indicating a vehicle type or features associated with each road segment or location. The vehicle capability data may be provided to the vehicle 302. The processor 318 of the remote data server 316 may collect additional data, such as terrain data, weather data, and geographic data, for example, to assist in identifying the most recent road segment classifications dynamically using artificial intelligence logic based on past and current data.

While only one remote data server 316 is shown, any number of remote data servers in communication with each other may be used.

Figure 4:
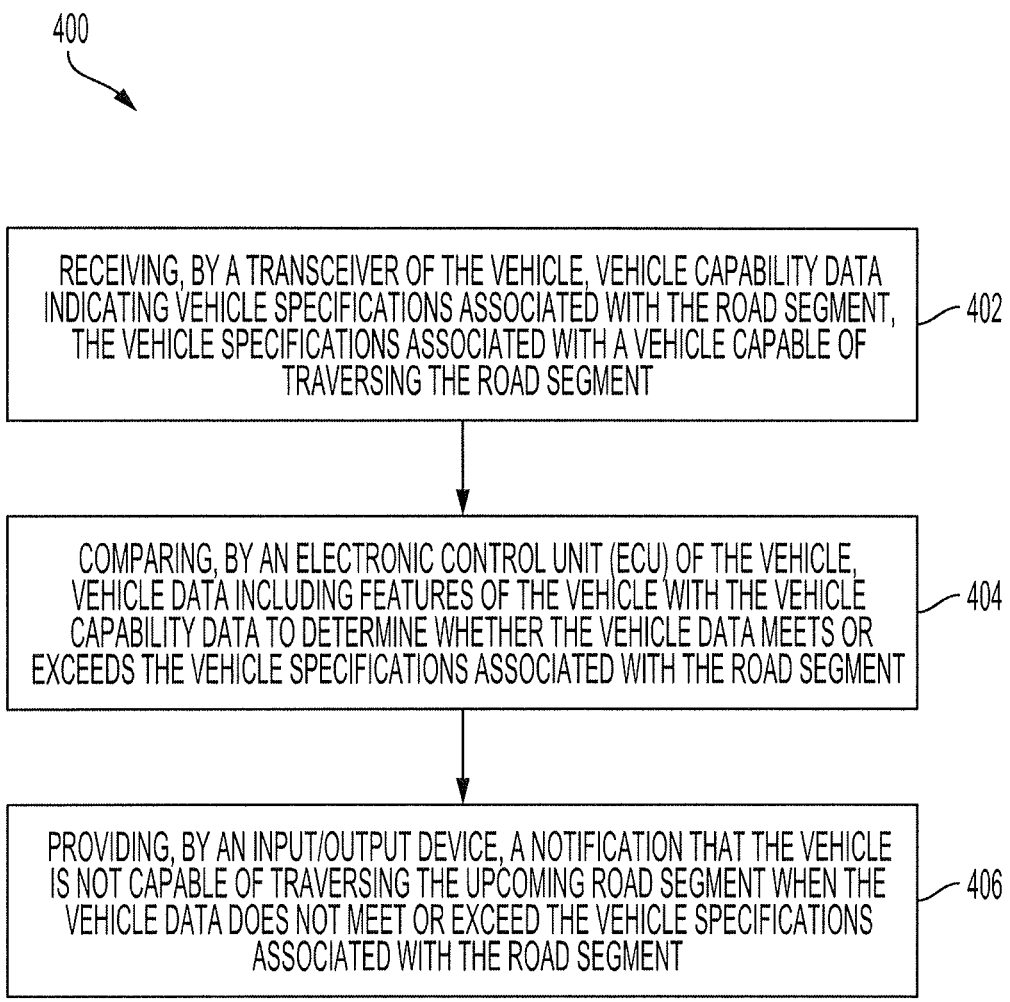
FIG. 4 illustrates a process of the system, according to various embodiments of the invention.

FIG. 4 illustrates a process 400 performed by the system described herein.

A transceiver (e.g., transceiver 306) of the vehicle (e.g., vehicle 302) receives vehicle capability data (step 402). The vehicle capability data indicates vehicle specifications associated with an upcoming road segment. Vehicles that are capable of traversing the upcoming road segment have vehicle features that meet or exceed the vehicle specifications associated with the upcoming road segment. For example, the vehicle capability data may include all or four-wheel drive and ground clearance of 12 inches. The vehicle capability data may be received from a remote data server (e.g., remote data server 316) via a transceiver (e.g., transceiver 320) of the remote data server. In some embodiments, the vehicle capability data may be passed from one vehicle to another via respective transceivers.

The ECU (e.g., ECU 304) of the vehicle compares the vehicle data to the vehicle capability data to determine whether the vehicle data meets or exceeds the vehicle specifications associated with the upcoming road segment (step 404). The vehicle data includes features of the vehicle. For example, the vehicle data may include two-wheel drive and all or four-wheel drive capability, and a ground clearance of 10.5 inches. In the example herein, the ECU compares the vehicle data and the vehicle capability data and determines that the vehicle's ground clearance of 10.5 inches does not meet or exceed the 12 inch ground clearance requirement of the upcoming road segment.

An input/output device (e.g., input/output device 308) provides a notification that the vehicle is not capable of traversing the upcoming road segment when the vehicle data does not meet or exceed the vehicle specifications associated with the upcoming road segment (step 406). In the example herein, the input/output device provides a notification that the vehicle is not capable of traversing the upcoming road segment, as the ground clearance is not sufficiently high. As described herein, the notification may be audible (provided by a speaker) or may be visual (provided by a display or heads-up display).

When the vehicle is capable of adjusting vehicle features, the ECU may automatically instruct a vehicle operations array (e.g., vehicle operations array 314) to adjust one or more features of the vehicle to meet or exceed the vehicle specifications of the vehicle capability data. For example, when the vehicle is capable of switching between two-wheel drive and all or four-wheel drive, the ECU may instruct the vehicle operations array to switch the vehicle from two-wheel drive to all or four-wheel drive when the vehicle specifications include all or four-wheel drive. In another example, when the vehicle is capable of adjusting its suspension, the ECU may instruct the vehicle operations array to increase the ground clearance from a current ground clearance to an increased ground clearance that meets or exceeds the ground clearance of the vehicle specifications associated with the upcoming road segment.

The vehicle may receive a map having a plurality of road segments and a respective plurality of vehicle capability data. The ECU may be capable of determining navigation directions to guide the driver of the vehicle to a destination, and the ECU may use the map to automatically avoid areas that the vehicle is not capable of driving through. The map may also be displayed to the user of the vehicle to illustrate the areas where the vehicle is not capable of driving through.

Figure 5:
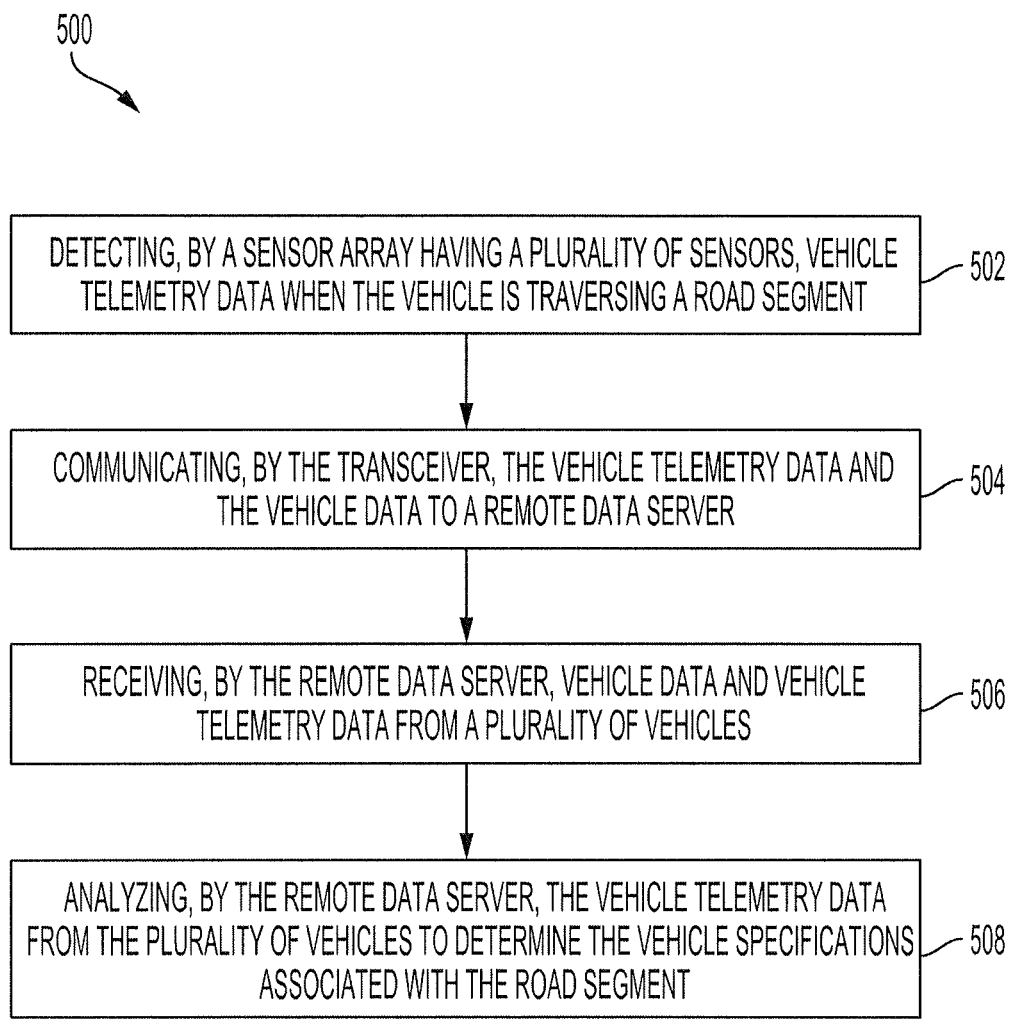
FIG. 5 illustrates a process of the system, according to various embodiments of the invention.

FIG. 5 illustrates a process 500 performed by the systems described herein.

A sensor array (e.g., sensor array 312) of a vehicle (e.g., vehicle 302) detects vehicle telemetry data when the vehicle is traversing a road segment (step 502). The sensor array may include an inertial measurement unit (IMU) (e.g., IMU 324), a suspension sensor (e.g., suspension sensor 326), a location sensor (e.g., location sensor 328), a brake sensor (e.g., brake sensor 330), an accelerator sensor (e.g., accelerator sensor 332), and a traction sensor (e.g., traction sensor 334), among other sensors.

A transceiver (e.g., transceiver 306) of the vehicle communicates the vehicle telemetry data and vehicle data to a remote data server (e.g., remote data server 316) (step 504). The vehicle data includes features of the vehicle. For example, the vehicle data may include two-wheel drive and all or four-wheel drive capability, and a ground clearance of 10.5 inches. The vehicle telemetry data reflects sensor data detected while the vehicle traversed the road segment. For example, the vehicle telemetry data may include a roll, pitch, and yaw experienced by the vehicle and detected by the IMU, suspension data indicating suspension ranges detected by the suspension sensor, any loss of traction detected by the traction sensor, and the location of the vehicle detected by the location sensor.

The remote data server receives vehicle data and vehicle telemetry data from a plurality of vehicles (step 506). The plurality of vehicles may each have a transceiver to communicate the vehicle data and the vehicle telemetry data to the remote data server using one or more networks. The remote data server may store the received vehicle data and the vehicle telemetry data in a non-transitory memory (e.g., memory 322). The vehicle data and the vehicle telemetry data may be associated with (and indexed by) the road segment traversed by the respective vehicle of the plurality of vehicles. For example, the remote data server may receive vehicle data and vehicle telemetry data associated with a particular road segment from 100 vehicles, which provides the experiences of the 100 vehicles as each of the 100 vehicles traversed the particular road segment.

The remote data server analyzes the vehicle telemetry data and the vehicle data from the plurality of vehicles to determine the vehicle specifications associated with the road segment (step 508). More particularly, the processor (e.g., processor 318) of the remote data server analyzes the vehicle telemetry data and the vehicle data from the plurality of vehicles.

The processor may use any number of techniques to analyze the vehicle telemetry data and the vehicle data to determine the baseline specifications of a vehicle that can safely traverse the road segment. The processor may first determine which of the vehicles safely traversed the road segment by analyzing the respective vehicle telemetry data. When any of the sensor data from the vehicle telemetry data is outside of a threshold range, the processor may determine that the vehicle did not safely traverse the road segment. For example, when the IMU data indicates that the vehicle's roll exceeded 40 degrees, the processor may determine that the vehicle did not safely traverse the road segment.

The processor may then determine vehicle features (as included in the vehicle data) in common among the vehicles that successfully traversed the road segment. These vehicle features in common may be included in the vehicle specifications associated with the road segment.

The determined vehicle specifications may be associated with respective road segments and a map may be generated and provided to vehicles by the remote data server, as described herein.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for identifying whether a vehicle is capable of safely traversing a road segment, the system comprising:
 a transceiver of the vehicle configured to receive vehicle capability data indicating vehicle specifications related to a plurality of vehicles and associated with the road segment, the vehicle specifications including a vehicle model or type associated with one or more of the plurality of vehicles, the vehicle capability data including a percentage of the one or more of the plurality of vehicles of the vehicle model or type having successfully traversed the road segment, the percentage exceeding a threshold percentage;
 an electronic control unit (ECU) of the vehicle configured to compare vehicle data including a model or type of the vehicle with the vehicle capability data to determine whether the model or type of the vehicle included in the vehicle data matches the vehicle model or type of the vehicle capability data; and
 an input/output device configured to provide a notification that the vehicle is not capable of traversing the road segment when the model or type of the vehicle included in the vehicle data does not match the vehicle model or type of the vehicle capability data.

2. The system of claim 1, further comprising a sensor array having a plurality of sensors configured to detect vehicle telemetry data when the vehicle is traversing a second road segment, and wherein the transceiver is further configured to communicate the vehicle telemetry data and the vehicle data to a remote data server.

3. The system of claim 2, wherein the remote data server is configured to receive vehicle data and vehicle telemetry data from the plurality of vehicles and analyze the vehicle telemetry data from the plurality of vehicles to determine the vehicle specifications associated with the road segment.

4. The system of claim 2, wherein the plurality of sensors include at least one of an inertial measurement unit, a suspension sensor, a location sensor, a brake sensor, an acceleration sensor, or a traction sensor.

5. The system of claim 1, wherein the ECU is further configured to avoid the road segment when determining navigation directions based on the vehicle not being capable of safely traversing the road segment.

6. The system of claim 1, further comprising a vehicle operations array configured to adjust one or more components of the vehicle, and wherein the ECU is further configured to automatically instruct the vehicle operations array to adjust the one or more components of the vehicle to match or exceed one or more portions of the vehicle specifications associated with the road segment.

7. The system of claim 1, wherein the input/output device is further configured to display a map of a plurality of road segments and indicate one or more road segments from the plurality of road segments that the vehicle is not capable of safely traversing by comparing the vehicle data with respective vehicle capability data of each road segment of the plurality of road segments.

8. A vehicle having vehicle features and comprising:
a transceiver configured to receive vehicle capability data indicating vehicle specifications related to a plurality of vehicles and associated with an upcoming road segment, the vehicle specifications including a vehicle model or type associated with one or more of the plurality of vehicles, the vehicle capability data including a percentage of the one or more of the plurality of vehicles of the vehicle model or type having successfully traversed the upcoming road segment, the percentage exceeding a threshold percentage;
an electronic control unit (ECU) configured to:
compare vehicle data including a model or type of the vehicle with the vehicle capability data to determine whether at least one portion of the vehicle data matches at least one portion of the vehicle specifications; and
an input/output device configured to provide a notification that the vehicle is not capable of traversing the upcoming road segment when the at least one portion of the vehicle data does not match the at least one portion of the vehicle specifications associated with the upcoming road segment.

9. The vehicle of claim 8, further comprising a sensor array having a plurality of sensors configured to detect vehicle telemetry data when the vehicle is traversing a second road segment, and wherein the transceiver is further configured to communicate the vehicle telemetry data and the vehicle data to a remote data server.

10. The vehicle of claim 9, wherein the remote data server is configured to receive vehicle data and vehicle telemetry data from the plurality of vehicles and analyze the vehicle telemetry data from the plurality of vehicles to determine the vehicle specifications associated with the upcoming road segment.

11. The vehicle of claim 9, wherein the plurality of sensors include a location sensor, a suspension sensor, and at least one of an inertial measurement unit, a brake sensor, an acceleration sensor, or a traction sensor.

12. The vehicle of claim 8, wherein the ECU is further configured to avoid the upcoming road segment when determining navigation directions based on the vehicle not being capable of safely traversing the upcoming road segment.

13. The vehicle of claim 8, further comprising a vehicle operations array configured to adjust one or more components of the vehicle, and wherein the ECU is further configured to automatically instruct the vehicle operations array to adjust the one or more components of the vehicle to match or exceed one or more portions of the vehicle specifications associated with the upcoming road segment.

14. The vehicle of claim 8, wherein the input/output device is further configured to display a map of a plurality of road segments and one or more indications of one or more respective road segments from the plurality of road segments that the vehicle is not capable of safely traversing by comparing the vehicle data with respective vehicle capability data of each road segment of the plurality of road segments.

15. A method for identifying whether a vehicle is capable of safely traversing a road segment, the method comprising:
receiving, by a transceiver of the vehicle, vehicle capability data indicating vehicle specifications related to a plurality of vehicles and associated with the road segment, the vehicle specifications including a vehicle model or type associated with one or more of the plurality of vehicles, the vehicle capability data including a percentage of the one or more of the plurality of vehicles of the vehicle model or type having successfully traversed the road segment;
comparing, by an electronic control unit (ECU) of the vehicle, vehicle data including a model or type of the vehicle with the vehicle capability data to determine whether the model or type of the vehicle included in the vehicle data matches the vehicle model or type of the vehicle capability data; and
providing, by an input/output device, a notification that the vehicle is not capable of traversing the road segment when the model or type of the vehicle included in the vehicle data does not match the vehicle model or type of the vehicle capability data.

16. The method of claim 15, further comprising:
detecting, by a sensor array having a plurality of sensors, vehicle telemetry data when the vehicle is traversing a second road segment; and
communicating, by the transceiver, the vehicle telemetry data and the vehicle data to a remote data server.

17. The method of claim 16, further comprising:
receiving, by the remote data server, vehicle data and vehicle telemetry data from the plurality of vehicles; and
analyzing, by the remote data server, the vehicle telemetry data from the plurality of vehicles to determine the vehicle specifications associated with the road segment.

18. The method of claim 15, further comprising avoiding, by the ECU, the road segment when determining navigation directions based on the vehicle not being capable of safely traversing the road segment.

19. The method of claim 15, further comprising automatically adjusting, by the ECU using a vehicle operations array, one or more components of the vehicle to match or exceed one or more portions of the vehicle specifications associated with the road segment.

20. The method of claim 15, further comprising:
    displaying, by the input/output device, a map of a plurality of road segments; and
    indicating, by the input/output device, one or more road segments from the plurality of road segments that the vehicle is not capable of safely traversing by comparing the vehicle data with respective vehicle capability data of each road segment of the plurality of road segments.

* * * * *